United States Patent [19]

McCarroll

[11] 4,062,272

[45] Dec. 13, 1977

[54] STATIONARY VENT APPARATUS

[76] Inventor: Raymond A. McCarroll, 1725 Newcastle, Grosse Pointe Woods, Mich. 48236

[21] Appl. No.: 719,940

[22] Filed: Sept. 2, 1976

[51] Int. Cl.$^2$ ............................................. B60J 1/20
[52] U.S. Cl. ................................... 98/2.12; 156/107; 296/152
[58] Field of Search ..................... 296/152, 91, 95, 96, 296/15; 98/2.12, 2.13, 2, 25, 27, 18; 156/99, 107; 52/511, 509; 248/204, 205, 467

[56] References Cited

U.S. PATENT DOCUMENTS

| 2,063,321 | 12/1936 | Luty | 126/116 R |
| 2,763,910 | 9/1956 | Braatelien | 156/293 |
| 2,841,440 | 7/1958 | Werner | 236/152 |
| 2,920,682 | 1/1960 | Lindberg | 156/293 |
| 3,104,274 | 9/1963 | King | 248/467 |
| 3,726,207 | 4/1973 | Young | 98/2.12 |
| 3,757,663 | 9/1973 | McCarroll | 98/2.12 |
| 3,919,023 | 11/1975 | Bowser et al. | 156/107 |

FOREIGN PATENT DOCUMENTS 754,509  10/1938  Germany ............................ 154/2.71

Primary Examiner—William E. Wayner
Assistant Examiner—Robert J. Charvat
Attorney, Agent, or Firm—Olsen and Stephenson

[57] ABSTRACT

A vent apparatus is mounted on an automobile door at the forward edge of the window opening, and the apparatus has a transparent plate which is secured permanently at an acute angle relative to the door glass. The apparatus includes two unitary die cast brackets each of which has a channel in its outer surface and in which the leading edge of the transparent plate is fixedly mounted. The shapes of the channels and the adhesive material employed for securing the transparent plate therein are such as to avoid creation of stress points in the transparent plate if the brackets are slightly misaligned during assembly on the automobile.

5 Claims, 4 Drawing Figures

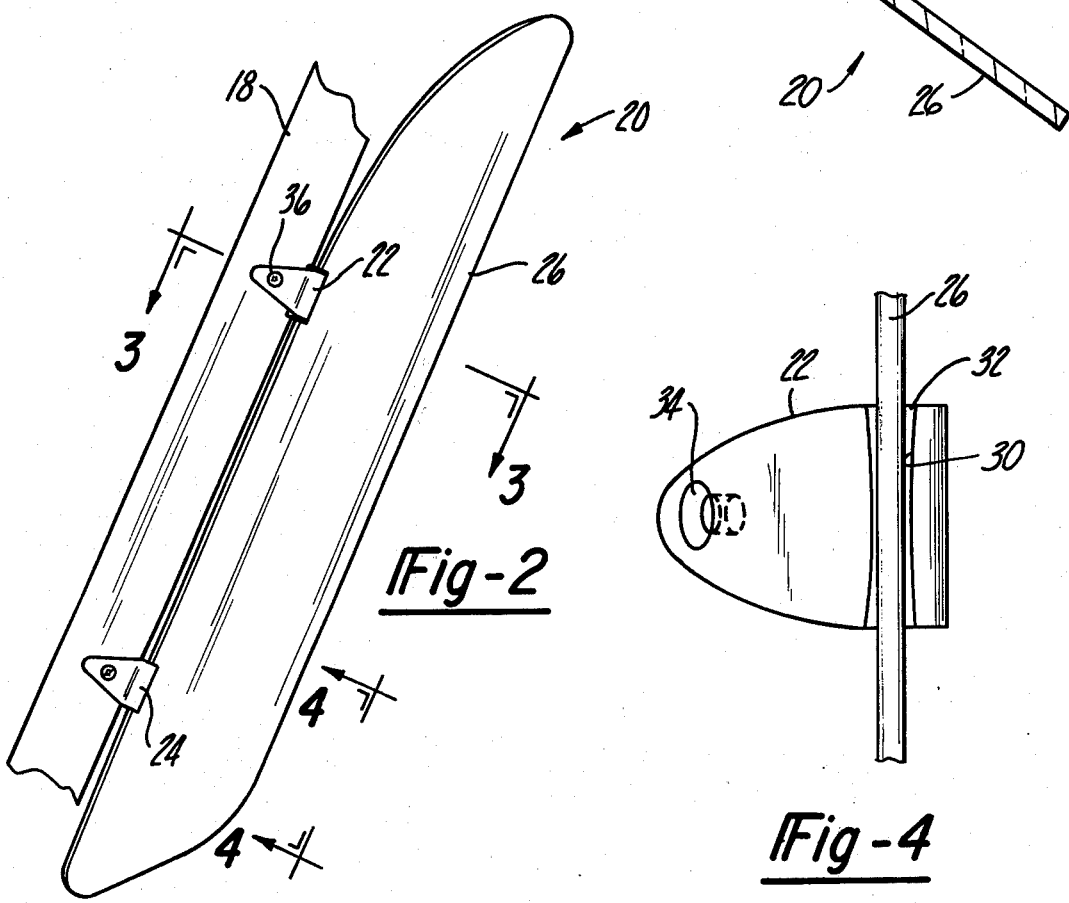

STATIONARY VENT APPARATUS

BACKGROUND OF THE INVENTION

The present invention relates to ventilation apparatus for mounting on the door of an automobile adjacent to the forward edge of the window opening.

Many of the automobiles being manufactured today have a single full window glass for the front door which provides certain advantages, and if the automobile is equipped with air conditioner apparatus, there may be little need for opening the window for ventilation purposes. However, without an air conditioner or under other circumstances when the driver or other occupants in the automobile desire to have air ventilation from the front door window, the absence of suitable vent windows in the doors creates problems for the occupants both from the standpoint of having insects, dust, dirt and the like entering the open window as well as having noise and undesirable drafts or air currents created.

Separate vent window attachments for automobiles have been known in the past, such as are shown, for example, in U.S. Pat. No. 3,757,663, issued Sept. 11, 1973 and U.S. Pat. No. 3,803,994, issued Apr. 16, 1974 to Raymond A. McCarroll. Constructions of the type shown in these patents have proved to be very satisfactory, but there is a further need for vent apparatus of this type which is characterized by its low cost, attractive styling, and efficient operation.

SUMMARY OF THE INVENTION

The present invention is directed to vent window apparatus for an automobile which is constructed and arranged to be used on automobiles having a full window glass in the front doors, and which can be added to a new automobile or which can be sold to the after market distributors for mounting on automobiles previously sold. The vent window apparatus embodying the present invention can be mounted on the forward edge of the door with its transparent plate at the optimum angle relative to the location of the door glass, thereby eliminating the need for adjustment means and also providing apparatus which is characterized by its distinctive styling.

According to a preferred form of the present invention, vent apparatus is provided for an automobile door having a window opening, the vent apparatus comprising upper and lower mounting brackets having inner surfaces conforming to the contours of the forward edge of the window opening and having channels in the outer surfaces extending in generally vertical alignment. A transparent plate is mounted in a permanently fixed position in the channels at a preestablished acute angle relative to the door glass. The two mounting brackets can readily and conveniently be secured to the edge of the window opening, and the channels in which the transparent plate are mounted are flared outwardly at each longitudinal end and the transparent plate is secured therein by an elastomeric adhesive material to accommodate any limited misalignments of the channels that may occur during mounting of the brackets on the edge of the window opening. This unique feature serves to eliminate any stress points which otherwise might be created in the transparent plate due to limited faulty installation of the vent apparatus. The mounting brackets are constructed and arranged so that a single opening is provided through each of them through which a self-tapping screw can be inserted for attachment of each bracket directly to the edge of the window opening.

Thus, it is an object of the present invention to provide an improved vent window apparatus for automobiles, particularly for automobiles of the type that have a full window glass in the front door.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a fragmentary perspective view of an automobile with a vent apparatus embodying one form of the present invention;

FIG. 2 is an enlarged side elevation of the vent apparatus mounted on the forward edge of the window opening of the door of the automobile;

FIG. 3 is an enlarged section taken on the lines 3—3 of FIG. 2; and

FIG. 4 is an enlarged fragmentary elevational view taken on the lines 4—4 of FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The automobile 10 has a front door 12 which includes a window opening 14 in which is mounted a full window or door glass 16. The door 12 provides a forward edge 18 which defines in part the window opening 14. The forward edge 18 has a convex configuration 19 facing laterally outward on the outer side surface of the door 12.

The vent apparatus 20 comprises an upper mounting bracket 22, a lower mounting bracket 24 and a transparent plate or glass 26 supported in the mounting brackets 22 and 24. The mounting brackets 22 and 24 are constructed identically the same, and only the mounting bracket 22 will be described in detail.

The mounting bracket 22 is preferably formed as a die cast member, and it has an inner mating surface 28 adapted to fit closely to the configuration of the forward edge 18 of the door 12. The outer surface of the bracket 22 has a channel 30 formed therein in which the transparent plate 26 can be mounted. For this purpose a conventional elastomeric adhesive 32 can be employed which can be made of suitable material, such as an epoxy resin, or other well known substances. The channel 30 is also flared outwardly at each longitudinal end, as can be seen best in FIG. 4. This construction is significant because the shape of the channel and the resilient properties of the elastomeric adhesive will accommodate slight misalignments that may occur between the channels of the respective brackets 22 and 24 when mounting the vent apparatus on the automobile, thereby avoiding creating stress points in the transparent plate or glass 26. It will be readily understood by those skilled in the art that creation of a stress point may create a hazardous condition because of the possibility that the stress point may result in cracking or breaking of the transparent plate 26.

For the purpose of mounting the brackets 22 and 24 on the forward edge of the window opening 16, a single opening 34 is provided through which a suitable self-tapping screw 36 can be inserted. If convenient, a flat fastener element 38 can be positioned on the inner surface of the window edge 18, or the screw can be secured directly to the edge 18.

Once the vent apparatus 20 has been installed, the acute angle between the transparent plate 26 and the door glass 16 will remain fixed. Various factors may influence the angle, but normally it will be preestablished within the range of 30° to 50°. Preferably an angle of approximately 45° will be employed. These angles can vary depending upon the dimensions of the transparent plate 26, the fore-and-aft dimensions of the window opening 16, and the like.

From the foregoing description it will be recognized that a relatively simple vent apparatus has been provided which can be installed directly onto an automobile with the transparent plate set at the optimum angle relative to the door glass, and further adjustments will be unnecessary. Further, the simplicity of the construction assures an attractive styling and also assures that a low cost item can be supplied to the market.

It is claimed:

1. In an automobile having a door with a window opening and a door glass for closing said opening, the forward edge of the opening having a convex configuration facing laterally outward on the outer side surface of the door, vent apparatus mounted on the outer convex surface of the forward edge of the opening comprising upper and lower mounting brackets vertically spaced from one another and having inner mating surfaces conforming to said convex surface of said forward edge and channels in the outer surfaces extending in generally vertical alignment, each mounting bracket being a rigid one-piece member, a transparent plate mounted in a permanently fixed position in said channels at a fixed acute angle to said door glass, and separate attachment means securing each bracket to said convex surface of the edge of the window opening.

2. In an automobile having a door with a window opening and a door glass for closing said opening, vent apparatus mounted on the forward edge of the opening comprising upper and lower mounting brackets having inner mating surfaces conforming to the contours of said forward edge and channels in the outer surfaces extending in generally vertical alignment, and a transparent plate mounted in a permanently fixed position in said channels at a fixed acute angle to said door glass, the sidewalls of said channels being flared outwardly at each of their longitudinal ends and said transparent plate being secured in the channels by an elastomeric adhesive material, said transparent plate being secured by said elastomeric adhesive material in spaced relation out of contact with said channel throughout the length of the latter and being spaced farther from said sidewalls near each of the ends of the channels by virtue of the outward flaring of said sidewalls to accommodate limited misalignment of the channels that may occur during installation so that stress points which might otherwise be introduced into the transparent plate due to misalignment of the channels are substantially eliminated.

3. The combination that is defined in claim 2, wherein each mounting bracket has a single opening extending through it through which a self-tapping screw can be located for attachment of the bracket to the edge of the window opening.

4. The combination that is defined in claim 2, wherein said fixed acute angle between said transparent plate and said door glass is within the range of 30° to 50°.

5. The combination that is defined in claim 4, wherein said fixed angle is approximately 45°.

* * * * *